US010717369B2

(12) United States Patent
Koike et al.

(10) Patent No.: US 10,717,369 B2
(45) Date of Patent: Jul. 21, 2020

(54) CHARGE CONTROL APPARATUS AND METHOD FOR ELECTRIC VEHICLE

(71) Applicant: MITSUBISHI JIDOSHA KOGYO KABUSHIKI KAISHA, Tokyo (JP)

(72) Inventors: Kazuya Koike, Tokyo (JP); Shinya Fujiwara, Tokyo (JP); Norihiko Hatsumi, Tokyo (JP); Koichi Tano, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 444 days.

(21) Appl. No.: 15/678,372

(22) Filed: Aug. 16, 2017

(65) Prior Publication Data
US 2018/0056804 A1   Mar. 1, 2018

(30) Foreign Application Priority Data

Aug. 31, 2016   (JP) ................................. 2016-169683

(51) Int. Cl.
*B60L 58/13*   (2019.01)
*B60L 1/06*    (2006.01)
(Continued)

(52) U.S. Cl.
CPC .......... *B60L 58/13* (2019.02); *B60H 1/00392* (2013.01); *B60L 1/003* (2013.01);
(Continued)

(58) Field of Classification Search
CPC .. B60L 58/13; B60L 1/06; B60L 1/003; B60L 53/00; B60L 2240/80; B60L 53/11;
(Continued)

(56) References Cited

U.S. PATENT DOCUMENTS

| 5,656,916 A | 8/1997 | Hotta |
| 5,788,597 A * | 8/1998 | Boll ........................ B60L 53/14 |
| | | 477/4 |
| 8,547,040 B2 * | 10/2013 | Kamachi ................... B60L 3/06 |
| | | 318/139 |

(Continued)

FOREIGN PATENT DOCUMENTS

| JP | 8-65815 A | 3/1996 |
| JP | 2012-183958 A | 9/2012 |

(Continued)

OTHER PUBLICATIONS

Extended European Search Report dated Jan. 16, 2018 issued in corresponding EP Patent Application 17 18 8215.

*Primary Examiner* — M Baye Diao
(74) *Attorney, Agent, or Firm* — Birch, Stewart, Kolasch & Birch, LLP

(57) ABSTRACT

A charge control apparatus for an electric vehicle that includes: a traction motor; a traction battery to which charging current is supplied from an external power source and that supplies current to the traction motor; and an electric device actuated by part of the charging current during charging of the traction battery is provided. The charge control apparatus includes: an instruction unit to instruct decrease of load of the electric device in case that the electric device is actuated during charging of the traction battery; a restriction unit to restrict the charging current after instruction of the decrease of load; and a load decreasing unit for decreasing load of the electric device after restricting the charging current.

7 Claims, 7 Drawing Sheets

(51) Int. Cl.
  *B60L 1/00* (2006.01)
  *B60L 53/00* (2019.01)
  *B60H 1/00* (2006.01)
  *B60L 53/10* (2019.01)

(52) U.S. Cl.
  CPC .............. *B60L 1/06* (2013.01); *B60L 53/00* (2019.02); *B60L 53/11* (2019.02); *B60L 2240/34* (2013.01); *B60L 2240/549* (2013.01); *B60L 2240/80* (2013.01); *Y02T 10/7072* (2013.01); *Y02T 90/121* (2013.01); *Y02T 90/128* (2013.01); *Y02T 90/14* (2013.01)

(58) Field of Classification Search
  CPC ........... B60L 2240/34; B60L 2240/549; B60H 1/00392; Y02T 10/7072; Y02T 90/14; Y02T 90/121; Y02T 90/128; H02J 7/0026; H02J 7/0088
  USPC ........................................................ 320/134
  See application file for complete search history.

(56) References Cited

U.S. PATENT DOCUMENTS

| | | | |
|---|---|---|---|
| 9,799,934 B2 * | 10/2017 | Kaihara | H01M 10/441 |
| 9,981,567 B2 * | 5/2018 | Kawano | H02J 7/0026 |
| 2012/0326667 A1 | 12/2012 | Ito et al. | |

FOREIGN PATENT DOCUMENTS

| | | | |
|---|---|---|---|
| JP | 2013-9558 A | 1/2013 | |
| JP | 2015-220952 A | 12/2015 | |

\* cited by examiner

CHARGE CONTROL APPARATUS AND METHOD FOR ELECTRIC VEHICLE

BACKGROUND

Technical Field

The present disclosure relates to a charge control apparatus and method for an electric vehicle, and in particular, relates to a charge control apparatus and method for an electric vehicle that actuates an electric device, using part of charging current, during the charging of a traction battery by an external power source and a method thereof.

Description of the Related Art

In this type of electric vehicle, when the charging of a traction battery that is a power source of a traction motor is needed, the traction battery is charged by an external power source at a charging station or the like. This type of electric vehicle is equipped with an electric device, such as electric water heater, whose power source is the traction battery. For example, when the vehicle interior needs to be heated during the charging, the electric device is sometimes actuated using part of the charging current directly. The current to be supplied to the water heater may be increased or decreased by a driver's switch operation, the temperature control based on a target temperature, or the like. For example, in the case where the water heater is stopped by the driver's switch operation, the current supposed to be supplied to the water heater may flow into the traction battery. Although the charging current to the traction battery is controlled by a charge control circuit (EV-ECU), it may not follow up a rapid increase in the charging current. Therefore, the charging current to the traction battery may temporarily increase. In such case, the traction battery may temporarily become an overvoltage state, possibly resulting in various negative effects on the traction battery. Particularly, in the case where the state of charge (SOC) of the traction battery is high, an overcharge state may be caused temporarily, which is undesirable for the traction battery.

As a measure against such a trouble, a patent literature (Japanese Patent Laid-Open No. 2015-220952) discloses a technique in which when the electric device is stopped during the charging of the traction battery, the charging current from the external power source is decreased, so that the overvoltage state of the traction battery is prevented.

However, it takes a certain amount of time to decrease the charging current from the external power source. Therefore, even if the decrease in the charging current is started at the time point when the electric device is stopped as in the case of the above patent literature, the decrease timing is expected to be too late and the increase in the charging current to the fraction battery may not be sufficiently decreased, and, therefore, such overvoltage state may not be eliminated.

SUMMARY

The present disclosure has been made for solving such a problem, and an object thereof is to provide a charge control apparatus for an electric vehicle that makes it possible to avoid, before happening, an overvoltage state caused by a temporary increase in the charging current to a traction battery, in the case where a load of the electric device that is actuated using part of the charging current is decreased during the charging of the traction battery by an external power source.

For achieving the above object, the charge control apparatus for the electric vehicle in the present disclosure is a charge control apparatus for an electric vehicle, the electric vehicle including: a traction motor; a traction battery to which charging current is supplied from an external power source and that supplies current to the traction motor; and an electric device actuated by part of the charging current during charging of the traction battery. The charge control apparatus further including: an instruction unit to judge decrease of load of the electric device in case that the electric device is actuated during charging of the traction battery; a restriction unit to restrict the charging current after instruction of the decrease of load by the instruction unit; and a load decreasing unit to decrease load of the electric device after restriction of the charging current by the restriction unit.

According to the charge control apparatus for the electric vehicle that is configured in this way, the load of the electric device is decreased after the charging current from the external power source has been decreased, and, therefore, the overvoltage state of the traction battery caused by the temporary increase in the charging current to the traction battery is avoided before happening.

For achieving the above object, the present disclosure provides also, as another aspect, a charge control method for an electric vehicle, the electric vehicle including: a traction motor; a traction battery to which charging current is supplied from an external power source and that supplies current to the traction motor; and an electric device actuated by part of the charging current daring charging of the traction battery, the charge control method comprising: a step of instructing decrease of load of the electric device in case that the electric device is actuated during charging of the traction battery; a step of restricting the charging current after instruction of the decrease of load by the step of instructing; and a step of decreasing load of the electric device after restriction of the charging current by the step of restricting.

According to the charge control method fox the electric vehicle that is configured in this way, the load of the electric device is decreased after the charging current from the external power source has been decreased, and, therefore, the overvoltage state of the traction battery caused by the temporary increase in the charging current to the traction battery is avoided before happening.

BRIEF DESCRIPTION OF THE DRAWINGS

The present disclosure Will become more fully understood from the detailed description given hereunder and the accompanying drawings which are given by way of illustration only, and thus, are not limitative of the present disclosure.

DETAILED DESCRIPTION OF THE PREFERRED EMBODIMENTS

Hereinafter, an embodiment of a charge control apparatus and method for an electric vehicle, in which the present disclosure is realized, will be described.

Figure 1:
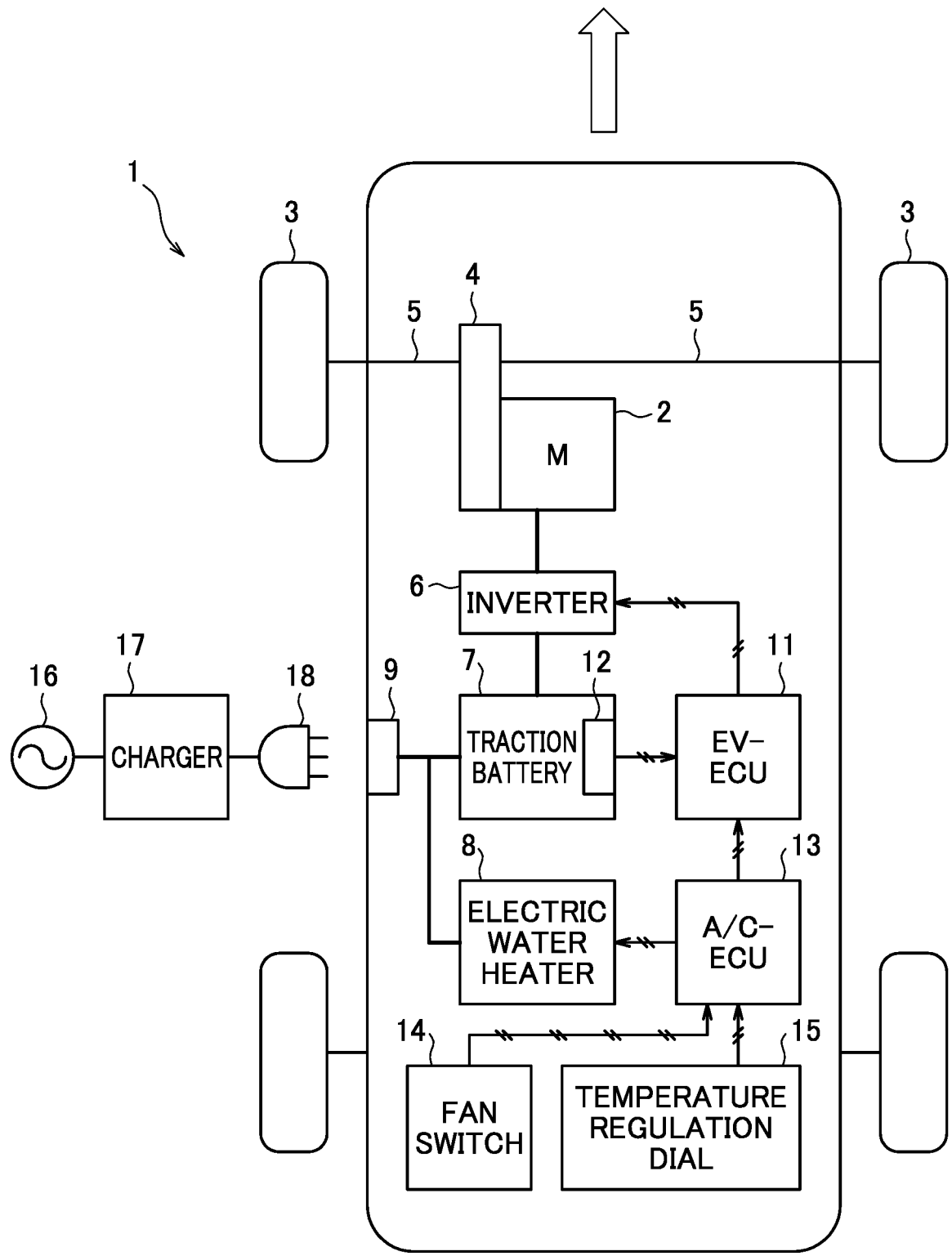
FIG. 1 is an overall configuration diagram showing an electric vehicle to which a charge control apparatus in an embodiment of the present disclosure is applied.

FIG. 1 is an overall configuration diagram showing an electric vehicle to which a charge control apparatus and method in the embodiment is applied.

A vehicle 1 in the embodiment is a front-wheel-drive vehicle that drives front wheels 3 with a traction motor 2. A speed reducer 4 connected with the traction motor 2 is connected with the right and left front wheels 3 through drive shafts 5, and the rotation of the traction motor 2 is reduced by the speed reducer 4 and then is transferred to the front wheels 3 through the drive shafts 5, so that the vehicle 1 travels. The traction motor 2 is connected with a traction battery 7 through an inverter 6, and the direct current (DC) from the traction battery 7 is converted into three-phase alternating current (AC) by the inverter 6, and is supplied to the traction motor 2. Further, the three-phase alternating current regenerated by the traction motor 2 during the travel of the vehicle is converted into direct current by the inverter 6, and is stored in the traction battery 7.

The traction battery 7 is connected with an electric water heater 8, and the water heater 8, which is actuated by the electric power supplied from the traction battery 7, performs the air heating of the vehicle interior, the warming-up of the traction battery 7, and the like. The traction battery 7 and the electric water heater 8 are electrically connected with a charging port 9 provided on a lateral part of a vehicle body. Through the charging port 9, the charging of the traction battery 7 and the power supply to the water heater 8 during the charging are performed as described later. Thus, the electric water heater 8 is the electric device which is actuated by part of the charging current during charging of the traction battery 7. It could be given an air conditioner unit for cooling, and the like as other examples of the electric device.

An EV-ECU 11, which is a control apparatus for performing the total control of the vehicle 1, is constituted by an input/output device; a storage device (a ROM, a RAM, a non-volatile RAM or the like); a central processing unit (CPU); and the like. In the above-described storage device of the EV-ECU 11, for example, the non-volatile RAM, a command (program) for executing a later-described process is stored. The EV-ECU 11 controls the operation of the traction motor 2, the charging of the traction battery 7 through the charging port 9, and the like. Therefore, the EV-ECU 11 is connected with a monitoring unit 12 that detects voltage or the SOC (State Of Charge) of the traction battery 7; the inverter 6; an unillustrated accelerator position sensor that detects an accelerator position θacc; an unillustrated vehicle speed sensor that detects a vehicle speed V; and the like. Detection information and actuation information from these devices are input to the EV-ECU 11, and a drive signal for operating the traction motor 2 is output from the EV-ECU 11 to the inverter 6.

Further, an A/C-ECU 13, which is a control apparatus for controlling the water heater 8, is constituted by an input/output device; a storage device (a ROM, a RAM, a non-volatile RAM or the like); a central processing unit (CPU); and the like. In the above-described storage device of the A/C-ECU 13, for example, the non-volatile RAM, a command (program) for executing the later-described process is stored. Therefore, the A/C-ECU 13 is connected with the water heater 8; a fan switch 14 of an air conditioner; a temperature regulation dial 15 for temperature setting; and the above EV-ECU 11. During the charging of the traction battery 7, which will be described later in detail, the charging current is appropriately controlled by the EV-ECU 11, based on a restricting instruction ON signal that is output from the A/C-ECU 13.

The charging of the traction battery 7 is performed by a quick charger 17, using an external power source 16 that is provided at a charging station or the like. A charge connector 18 is connected with the quick charger 17, and at the time of the charging, the charge connector 18 is connected to the charging port 9 of the vehicle 1 by a driver. When the charge connector 18 is connected to the charging port 9, the quick charger 17 and the traction battery 7 are connected through a power line for charging, and in addition, the quick charger 17 and the EV-ECU 11 are connected through a signal line for charge control, so that the charging current from the quick charger 17 can be controlled based on an instruction from the EV-ECU 11. Thus, the traction battery 7 is charged by the charging current supplied from the external power source 16. It should be noted that the traction battery 7 may be charged using the charge connector 18 directly connected to the external power source 16, without using the quick charger 17. In such case, it may take more time to charge the traction battery to a fully charged condition, because the voltage of the external power source is basically not controlled.

During the charging of the traction battery 7, the water heater 8 may be actuated for the purpose of the air heating of the vehicle interior and the warming-up of the traction battery 7, and in this embodiment, part of the charging current is used for the actuation of the water heater 8. The actuation of the water heater 8 may be manually started by a driver, or may be automatically started in accordance with a command from the A/C-ECU 13. As described in "Description of the Related Art", there is the possibility that the traction battery 7 may become the overvoltage state temporarily due to the rapid increase in the charging current supplied to the traction battery, for example, when the load (i.e., output) of the water heater 8 is decreased during the charging.

Hence, according to a charge control in this embodiment, when decrease of the load of the water heater 8 is instructed (requested) during the charging of the traction battery 7, the load will be decreased after the regulation of the charging current. The control, which is executed in cooperation between the EV-ECU 11 and the A/C-ECU 13, will be described below.

Figure 2:
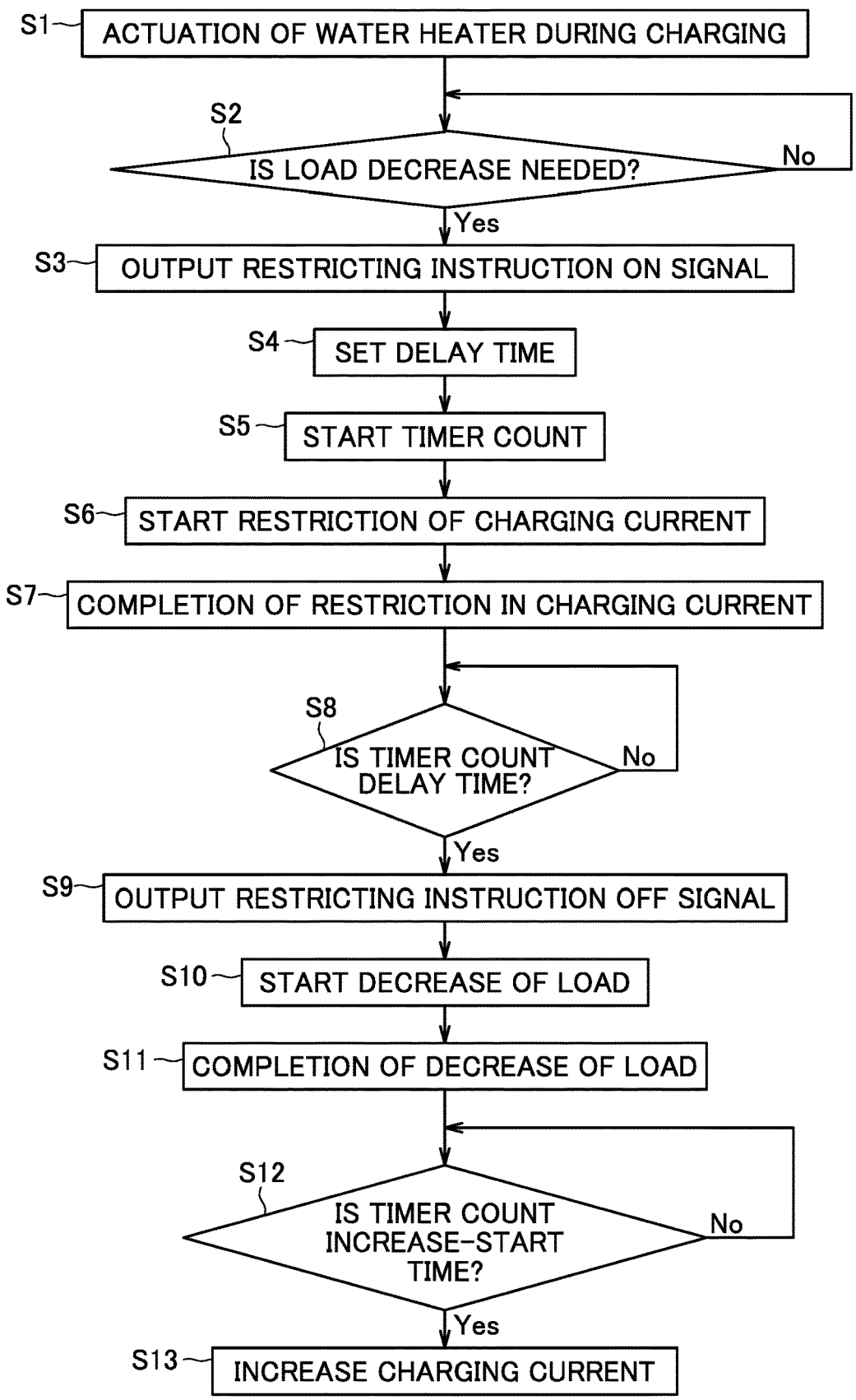
FIG. 2 is a flowchart showing a processing procedure when the load of a water heater is decreased during the charging of a traction battery in the embodiment.
Figure 3:
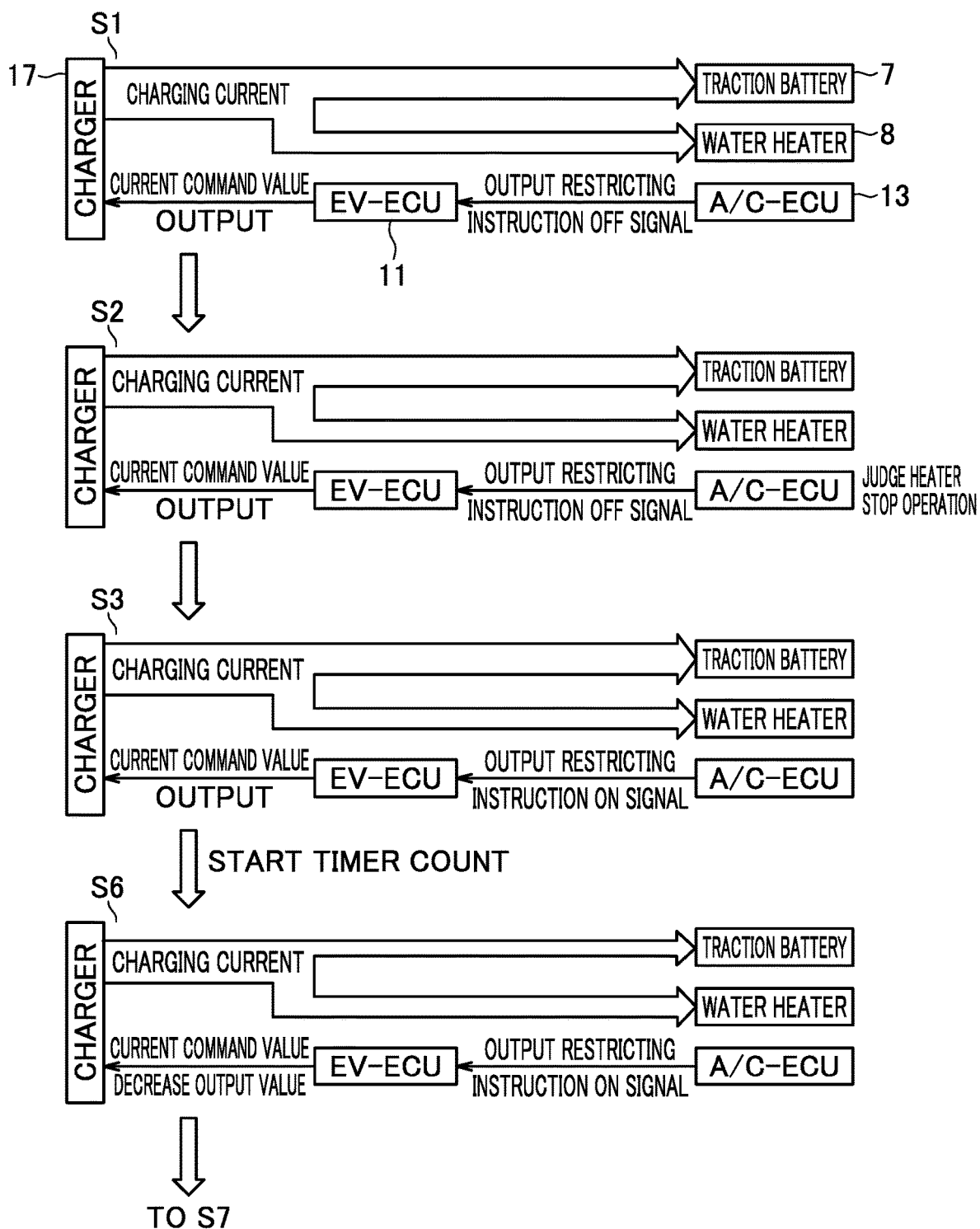
FIG. 3 is an explanatory diagram showing situations of the restriction in charging current that are obtained by processes in FIG. 2.
Figure 4:
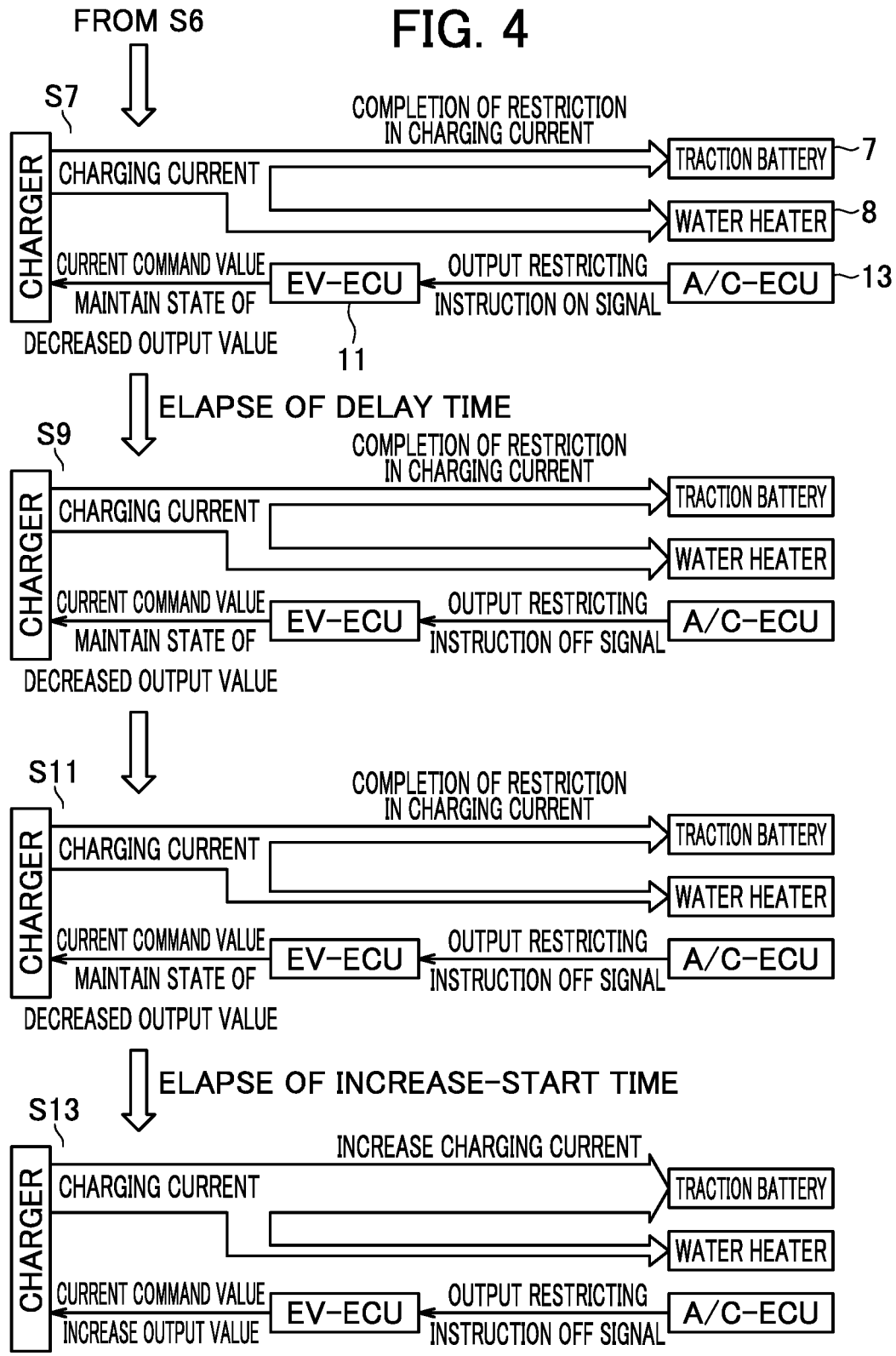
FIG. 4 is a similar explanatory diagram showing situations of the restriction in charging current that are obtained by processes in FIG. 2.

FIG. 2 is a flowchart showing a processing procedure when the load of the water heater 8 is decreased during the charging of the traction battery 7, and FIGS. 3 and 4 are explanatory diagrams showing situations of the restriction in the charging current that are obtained by the processes in FIG. 2. Here, between the processes in FIG. 2 and the situations of the restriction in the charging current in FIGS. 3 and 4, identical step numerals are assigned, for the clarification of the correspondence relation between them. In the description of each process in FIG. 2 described below, the ECU 11 or 13 that executes the process will be shown in parentheses.

First, in step S1 of FIG. 2, it is judged that the water heater has been actuated during the charging of the traction battery 7 (EV-ECU, A/C-ECU). The water heater 8 may be actuated in cases of the air heating of the vehicle interior, the warming-up of the traction battery 7, and the like. The A/C-ECU 13 judges the actuation of the water heater 8 based on, for example, input values of the fan switch 14 or temperature regulation dial 15.

As shown in FIG. 3, at this time, the A/C-ECU 13 outputs a restricting instruction (restriction request) OFF signal indicating that the restriction in the charging current has not been instructed (requested), and the EV-ECU 11, after receiving this signal, outputs an ordinary current command value to the quick charger 17. As a result, the charge control of the traction battery 7 is ordinarily executed, i.e., the traction battery 7 is charged and the water heater 8 is actuated with the charging current from the quick charger 17.

Subsequently, in step S2, whether or not decrease of load (i.e., output or power consumption) of the water heater 8 is necessary is judged (A/C-ECU). That is, it is judged whether the decrease of load of the water heater 8 is instructed by the A/C-ECU 13. In the embodiment, the A/C-ECU 13 corresponds to the instruction unit for instructing decrease of load of the electric device, and step S2 corresponds to the step of instructing decrease of the load of the electric device. Instructing of decrease of the load is judged based on switching of the fan switch 14 from ON to OFF, or decreasing of output levels of the temperature regulation dial 15. In the case of Yes affirmative judgement), the flow proceeds to step S3.

When the flow proceeds to step S3, a restricting instruction ON signal indicating the request of the restriction in the charging current is output (A/C-ECU) and then input to the EV-ECU 11.

In step S4, a delay time, which will be described later in detail, is set based on the maximum load of the water heater 8 and the decrease rate of the charging current while the charging current is being restricted by the quick charger 17 (EV/ECU 11). Thus, the EV-ECU 11 corresponds to the setting unit for setting a delay time, and step S4 corresponds to a step of setting the delay time.

In step S5, timer count is started, and in step S6, the restriction of the charging current is started (EV-ECU). Specifically, the current command value output from, the EV-ECU 11 is decreased, and, based on the current command value, the charging current from the quick charger 17 is gradually decreased to a limit value. The limit value is such low value that the traction battery 7 does not become in an overvoltage state even when the current flown to the traction battery 7 is increased temporarily due to the decrease of load of the water heater 8. The limit value is determined based on the charging current-value at the time of starting the restriction, the load of the water heater 8, the voltage of the traction battery 7, the decrease amount of load of the water heater 8, and the like. When the charging current is decreased to the limit value, the completion of the restriction of the charging current is judged in step S7 (EV-ECU 11). Thus, in the embodiment, the EV-ECU 11 corresponds to the restriction unit to restrict the charging current, and step S6 corresponds to a step of restricting the charging current. In FIGS. 3 and 4, the amount of the charging current is expressed as the width of an arrow, and as is clear from the comparison between step S6 and step S7, the width of the arrow is narrowed corresponding to the decrease in the output value of the current command value.

Thereafter, when it is judged that the timer count reaches a later-described delay time in step S8, the restricting instruction OFF signal is output instead of the restricting instruction ON signal in step S9 (A/C-ECU), and the restriction OFF signal is input to the EV-ECU 11 as shown in step S9 of FIG. 4. Thus, step S8 corresponds to the step of judging whether the delay time has elapsed. Further, the restricting instruction OFF signal may be output when the completion of the restriction of the charging current is judged in step S7. In such case, the timer count executed in step S8 can be omitted.

Then, in step S10, the decrease of load of the water heater 8 is started (A/C-ECU). Specifically, the A/C-ECU 13 decreases the load of the wafer hearer 8 to the value according no output level of the temperature regulation dial 15, or zero to stop the actuation of the water heater 8. When the load is decreased to the desired value, the completion of the decrease of the load is judged in step S11 (A/C-ECU). Thus, in the embodiment, the EV-ECU 13 corresponds to the load restriction unit to decrease load of the electric device, and step S10 corresponds to the step of decreasing load of the electric device.

Thereafter, when it is judged that, the timer count reaches a later-described increase-start time in step S12, the charging current which has been restricted is returned (i.e., increased) to the value before the restriction in the subsequent step S13 (EV-ECU). By this process, the restriction of the charging current is released, and the charging state returns to a charging state according to the normal charging current. It should be noted that the increase in the charging current may be performed when the completion of the decrease of the load is judged in step S11. In such case, the timer count performed in step S12 can be omitted.

Situations of the above restriction in the charging current that is executed by the EV-ECU 11 and the A/C-ECU 13 will be described in time series, based on time charts of FIGS. 5 and 6.

First, the case where the stop operation of the water heater 8 is performed (which corresponds to a process through steps S2 to S11 of FIG. 2) will be described.

Figure 5:
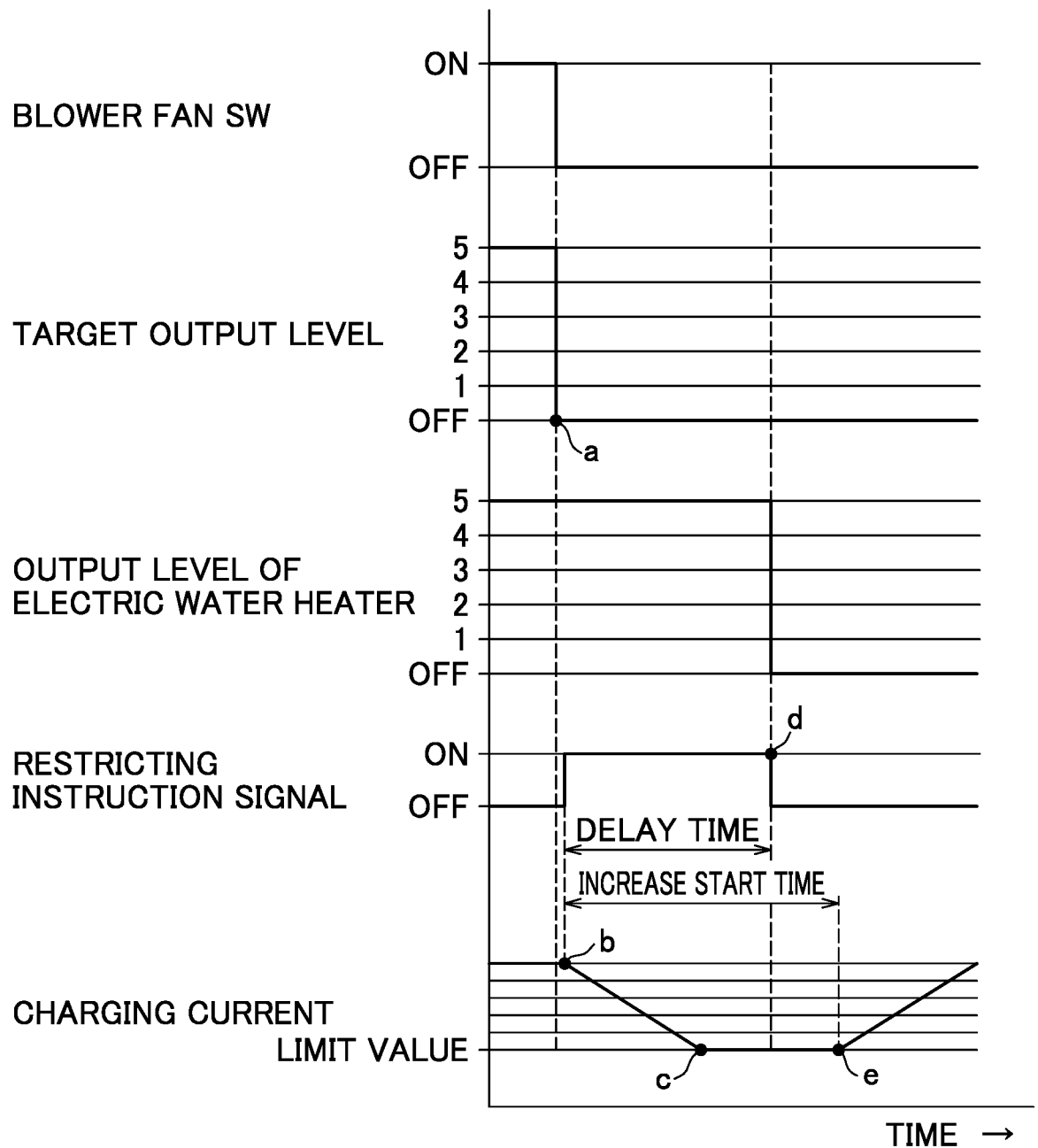
FIG. 5 is a time chart showing a situation of the restriction in the charging current in the case where a fan switch is switched from ON to OFF in the embodiment.

FIG. 5 shows a case where the fan switch 14 of the water heater 8 is switched from ON to OFF, and the water heater 8 is stopped by the OFF operation.

The water heater 8 in the embodiment is constituted by three PTC heaters, which are not illustrated, and can perform the output at five steps (levels) of 1 to 5, in the ON state, depending on the combination of PTC heaters that are energized. FIG. 5 shows a case where the stop operation of the water heater 8 is performed during the actuation at the maximum target output level 5. In association with the heater stop operation, the A/C-ECU 13 switches the target output level to OFF in a stepwise manner (a point "a" in FIG. 5).

At this time point, the restricting instruction ON signal is output from the A/C-ECU 13, and the charging current of the quick charger 17 starts to decrease, based on the output value of the current command value that is output from the EV-ECU 11 in response to the restricting instruction ON signal, (a point "b" in FIG. 5). Here, the start of the restriction in the charging current is slightly delayed due to a required time for signal transfer to the quick charger, and the like.

At this time, the charging current is decreased at a predetermined decrease rate per unit time, which depends on the technical standard of the quick charger 17 and the like, and at the time point when the charging current has been decreased to a predetermined limit value, the EV-ECU 11 maintains the charging current in its value (a point "c" in FIG. 5). The output of the restricting instruction ON signal from the A/C-ECU 13 is continued for a predetermined delay time (for example, 3 sec), and at the time point when the delay time has elapsed (a point "d" in FIG. 5), the charging current has been already decreased to the limit value.

When the delay time has elapsed, the actual output level of the water heater 8 is switched from 5 to OFF by the A/C-ECU 13, and thereby, the water heater 8 is stopped. Thereafter, when a predetermined increase-start time (for example, 4 sec) has elapsed since the input of the restricting instruction ON signal (a point "e" in FIG. 5), the charging current of the quick charger 17 starts to increase based on the output value of the current command value from the EV-ECU 11.

The reason why the increase in the charging current is not started immediately after the elapse of the delay time and the increase is started after the elapse of the increase-start time is to surely prevent a situation in which the increase in the charging current is started immediately before the stop of the water heater 8.

Thus, when the stop operation of the water heater 8 is performed by the OFF operation of the fan switch 14 or the switching of the temperature regulation dial 15 to the air cooling range, the charging current of the quick charger 17, first, is restricted, and then, the water heater 8 is actually stopped after the restriction in the charging current (after the elapse of the delay time).

As is clear from the above description, the limit value of the charging current and the delay time may be set to any values as long as they satisfy the condition that the delay time elapses after the charging current decreases to the limit value. For example, the delay time may foe set based on the maximum load (maximum power consumption) of the water heater 8 and the decrease rate at which the quick charger 17 restricts the charging current. In particular, a longer time is required for the restriction in the charging current as the maximum power consumption becomes greater, and a longer time is required for the restriction in the charging current as the decrease rate of the charging current becomes lower. Therefore, the delay time may be prolonged depending on them.

The limit value of the charging current may be set, for example, based on the decrease amount of the load of the water heater 8 (in the above example, the amount of the decrease from the output level 5 to OFF). Specifically, as the decrease amount of the load on the water heater 8 becomes greater, the phenomenon that the current supposed to be supplied to the water heater 8 flows into the traction battery 7 becomes more conspicuous and the necessity of the restriction in the charging current becomes higher. Hence, the limit value of the charging current may be decreased as the decrease amount of the load of the wafer heater 8 becomes greater.

Next, a case where the output level of the water heater 8 is decreased will be described.

Figure 6:
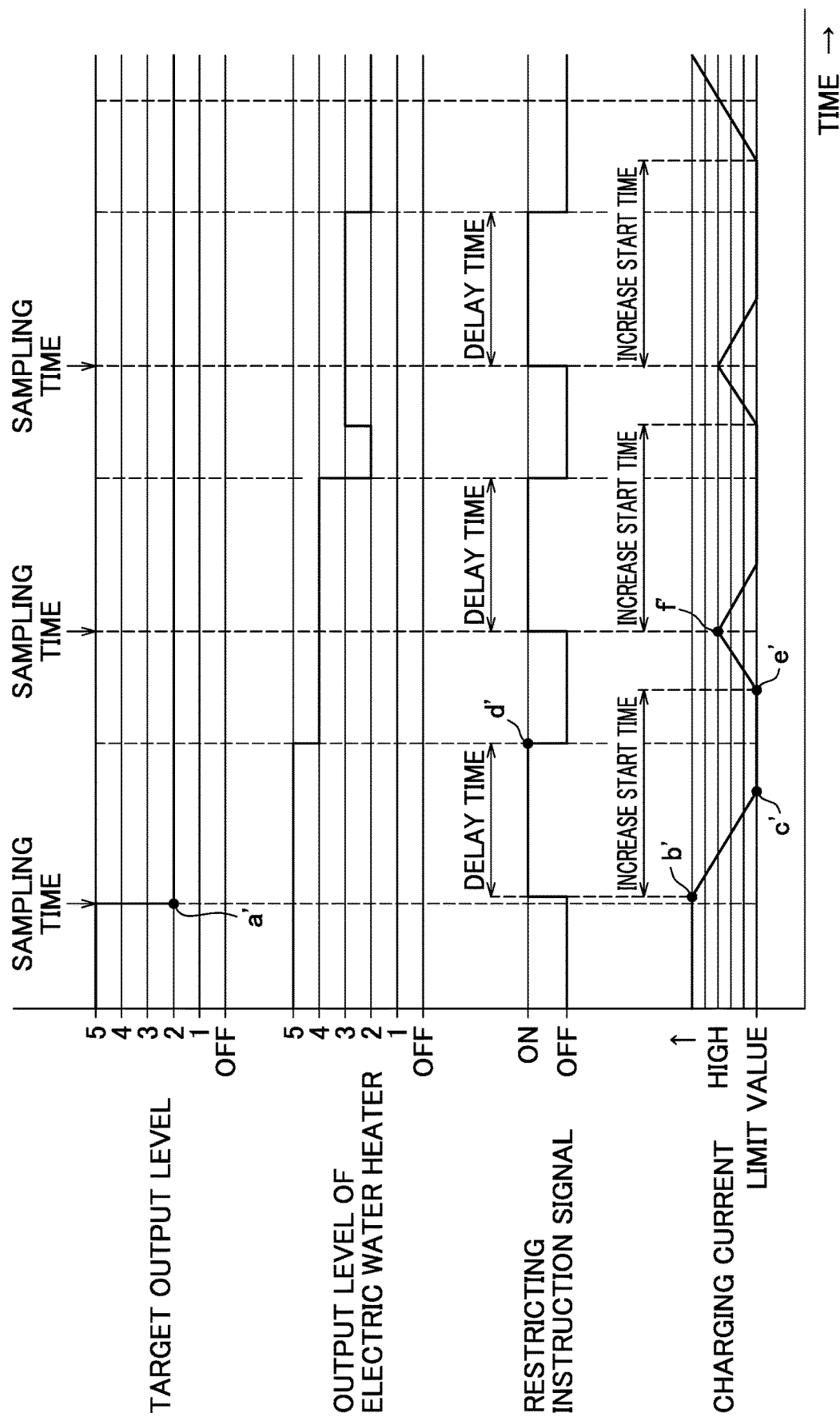
FIG. 6 is a time chart showing a situation of the restriction in the charging current in the case where a target output level is switched from 5 to 2 in the embodiment.

FIG. 6 shows a case where the target output level of the water heater 8 is switched from 5 to 2. Such a decrease in the target output level occurs when the power of the water heater 8 needs to be weakened, and for example, corresponds to a case where the temperature regulation dial 15 is switched to the temperature decrease side in the air heating range, a case where the actual temperature has risen by the temperature control for the vehicle interior, and the like.

In contrast to the stepwise switching of the target output level, as shown in FIG. 6, the actual output level is switched in stages every predetermined sampling time (for example, an interval of 5 sec) in the order of 5-4-3-2. The reason is to prevent a rapid temperature decrease and keep comfort in the vehicle inferior. Here, the output, level is once switched to 2 when being switched from 4 to 3, and this is a phenomenon that inevitably occurs because the combination of the PTC heaters is changed.

Then, every time the actual output level is switched, the same process as the above process in the case where the water heater 8 is stopped is executed. That is, when the target output level is switched from 5 to 2 (a point "a'" in FIG. 6), the restricting instruction ON signal, first, is output from the A/C-ECU 13, and the charging current of the quick charger 17 starts to decrease (a point "b'" in FIG. 6). At the time point when the charging current decreases to a predetermined limit value, the limit value is maintained (a point "c'" in FIG. 6), and after the elapse of the delay time, the actual output level of the water heater 8 is switched from 5 to 4 (a point "d'" in FIG. 6). Thereafter, when the increase-start time has elapsed, the charging current starts to increase (a point "e'" in FIG. 6).

Further, when the sampling time has elapsed, the restricting instruction ON signal is output again, and the charging current of the quick charger 17 starts to decrease (a point in FIG. 6). At this time, there is no control problem even if the charging current does not return to the value before the restriction as illustrated, and there is no problem even if the charging current returns to the value before the restriction.

In the subsequent switching of the output level from 4 to 3 and the switching of the output level from 3 to 2, the same process as the above process is executed, although repetitive descriptions are omitted.

Thus, as in the case of the stop of the water heater 8 described above, also in the case where the output level is switched in stages every sampling time for the decrease in the output level of the water heater 8, the charging current of the quick charger 17, first, is restricted, and then, the output level is actually switched to the decrease side after the restriction in the charging current is completed (after the elapse of the delay time).

Accordingly, in both the case where the water heater 8 is stopped and the case where the output level is decreased without the stop, the charging current has been surely restricted at the time point when the output level of the water heater 8 is decreased. Therefore, it is possible to prevent a situation in which the restriction in the charging current lags behind the stop operation of the water heater 8 as in the case of the technology in the above patent literature, and as a result, it is possible to avoid, before happening, the overvoltage state caused by the temporary increase in the charging current to the traction battery 7.

In the embodiment, the A/C-ECU 13 judges that the restriction in the charging current is completed, on the condition that the delay time has elapsed, taut the present disclosure is not limited to this. For example, at the time point when the restriction in the charging current is completed, the EV-ECU 11 may output a signal indicating the restriction completion, to the A/C-ECU 13, and based on the input of the signal, the A/C-ECU 13 may decrease the output level of the water heater 8.

In the meantime, because the quick charger 17 that is provided at the charging station and the like is standardized, the decrease rate of the charging current at the time of the restriction is supposed to be a value in accordance with the standard. Therefore, the restriction in the charging current is supposed to be completed after the elapse of the delay time, and as a result, the above function effect is obtained. However, in some cases, a non-standard quick charger 17 in which the decrease rate of the charging current is very low may be used. In such cases, before the restriction of the charging current is completed, the output level of the water heater 8 is decreased based on the elapse of the delay time, and therefore, there may be a possibility that the overvoltage state of the traction battery 7 cannot be avoided.

Further, in the case where the A/C-ECU 13 decreases the output level of the water heater 8 on the condition that the signal indicating the restriction completion is input as described above, if the signal indicating the restriction completion is not input to the A/C-ECU 13 because the decrease rate of the charging current is very low, the water heater 8 continues to wait in a state where the target output level is different from the actual output level, thereby causing troubles.

Figure 7:
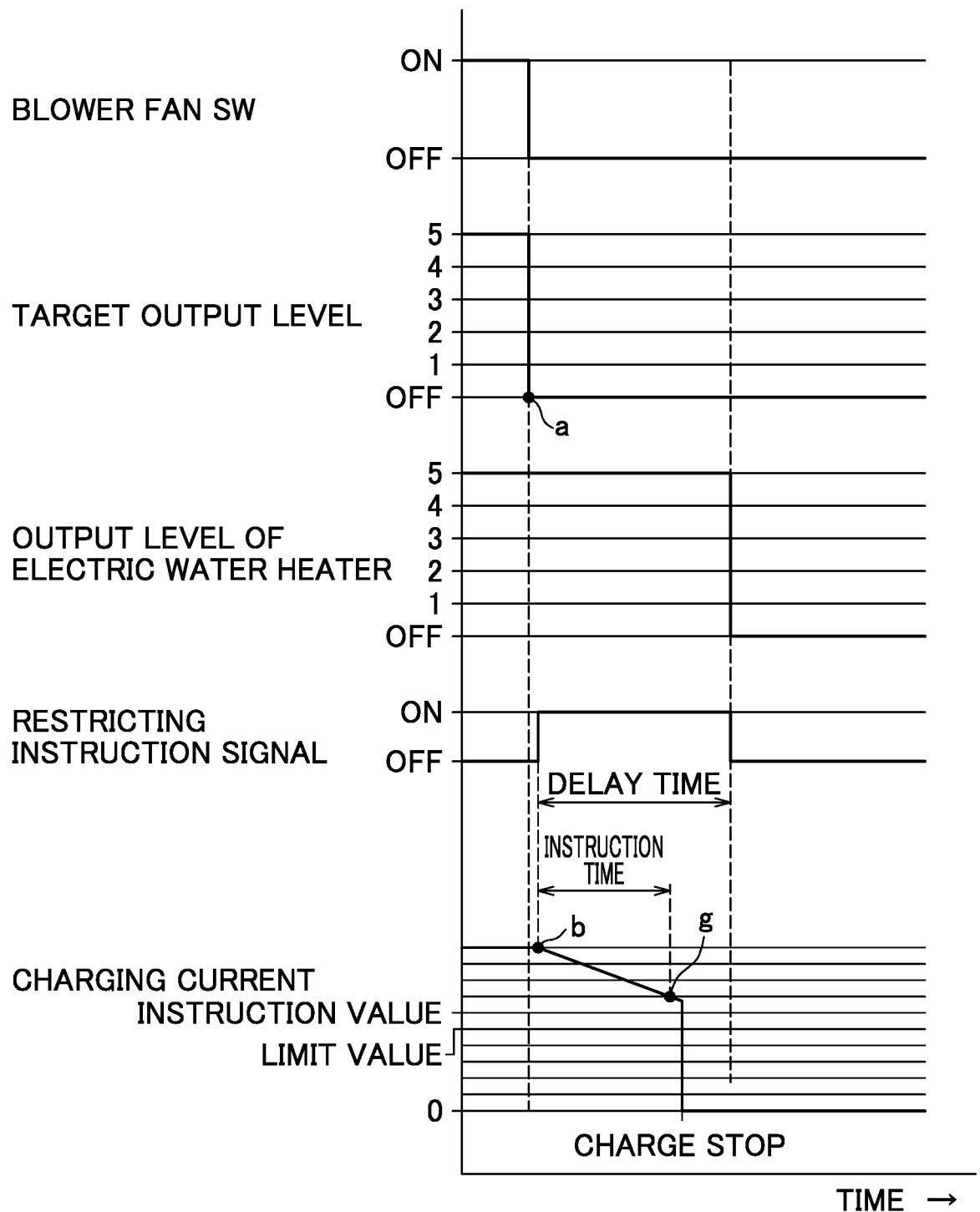
FIG. 7 is a time chart showing another example in which the charging current is cut off in the case where a decrease rate of the charging current is low in the embodiment.

Hence, as shown in FIG. 7, in the case where the charging current does not decrease to a predetermined instruction value even though a predetermined instruction time (for example, 2 sec) has elapsed since the start of the restriction in the charging current (a point "g" in FIG. 7), the charging of the traction battery 7 may be forcibly stopped by cutting off (breaking) the charging current. Thereby, it is possible to protect the traction battery 7 and the water heater 8. The predetermined instruction time is a value equal to the limit value or larger and can be determined appropriately in consideration of the capacity or the SOC of the traction battery 7, factor of safety, and the like.

The embodiment has been described above. Aspects of the present disclosure are not limited to the embodiment. For example, in the above embodiment, the charging current to the traction battery 7 is restricted when the output level of the water heater 8 is decreased, but the electric device is not limited to the water heater 8 if the electric device is an electric device whose power source is the traction battery 7, and the present disclosure may be applied, for example, to an air conditioner having an air cooling function.

Further, in the above embodiment, it is assumed that the traction battery 7 is charged by the quick charger 17 provided in the external power source 16, but the control in the above embodiment may be executed when the traction battery 7 is charged directly from the external power source using a vehicle-mounted charger. Even in the vehicle-mounted charger, because the decrease rate of the charging current is supposed to be a value corresponding to the vehicle-mounted charger, the above delay time can be set using the decrease rate as in the case where the quick charger is used.

The invention claimed is:

1. A charge control apparatus for an electric vehicle, the electric vehicle including: a traction motor; a traction battery to which charging current is supplied from an external power source and that supplies current to the traction motor; and an electric device actuated by part of the charging current during charging of the traction battery, the charge control apparatus comprising:
an instruction unit that generates an instruction to decrease load of the electric device while the electric device is being actuated by the charging current during charging of the traction battery by the charging current; and
a controller and a storage storing a program that causes the controller to:
restrict the charging current to the traction battery after the instruction to decrease the load of the electric device by the instruction unit is generated, the charging current to the electric device being maintained and the charging current to the traction battery being restricted to a value that does not overcharge the traction battery when the load of the electric device is decreased; and
decrease the load of the electric device after the restriction of the charging current to the traction battery is completed.

2. The charge control apparatus for the electric vehicle according to claim 1, wherein in case that the charging current is supplied via an external charger, the program causes the controller to restrict the charging current by controlling the external charger.

3. The charge control apparatus for the electric vehicle according to claim 1, wherein the program further causes the controller to
set a delay time based on a maximum load of the electric device and a decrease rate of the charging current while the charging current is being restricted, and
decrease load of the electric device when the set delay time has elapsed after start of the restriction of the charging current.

4. The charge control apparatus for the electric vehicle according to claim 1, wherein the program causes the controller to decrease the charging current supplied from the external power source to a limit value based on an instructed decrease amount of load of the electric device.

5. The charge control apparatus for the electric vehicle according to claim 1, wherein the program causes the controller to cut off the charging current, in the case where the charging current does not decrease to a predetermined instructed value despite elapse of a predetermined instructed time since start of the restriction in the charging current.

6. A charge control method for an electric vehicle, the electric vehicle including: a traction motor; a traction battery to which charging current is supplied from an external power source and that supplies current to the traction motor; and an electric device actuated by part of the charging current during charging of the traction battery, the charge control method comprising:
a step of generating an instruction to decrease load of the electric device while the electric device is being actuated by the charging current during charging of the traction battery by the charging current;
a step of restricting the charging current to the traction battery after the instruction to decrease the load of the electric device is generated, the charging current to the electric device being maintained and the charging current to the traction battery being restricted to a value that does not overcharge the traction battery when the load of the electric device is decreased; and
a step of decreasing the load of the electric device after the restriction of the charging current is completed.

7. The charge control method for the electric vehicle according to claim 6, further comprising, before the step of decreasing:
a step of setting a delay time based on a maximum load of the electric device and a decreasing rate of the charging current while the charging current is being restricted, and
a step of judging whether the delay time has elapsed since start of the restriction of the charging current.

* * * * *